US006217966B1

(12) United States Patent
Finster et al.

(10) Patent No.: US 6,217,966 B1
(45) Date of Patent: Apr. 17, 2001

(54) DESENSITIZED PRICE LABEL

(75) Inventors: Wayne D. Finster, Viroqua, WI (US); W. Tony Kosarew, Centerville, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/259,117

(22) Filed: Feb. 26, 1999

(51) Int. Cl.[7] .................................. C09J 7/02; G09F 3/02; G09F 3/20; G06F 17/60

(52) U.S. Cl. .......................... 428/42.1; 428/42.2; 428/43; 283/81

(58) Field of Search .................................. 428/42.1, 42.2, 428/42.3, 40.1, 41.9, 43; 283/81

(56) References Cited

U.S. PATENT DOCUMENTS

| | | | | |
|---|---|---|---|---|
| 3,464,883 | * | 9/1969 | Moline et al. | 428/42.2 |
| 3,501,365 | * | 3/1970 | Marshall | 428/42.3 |
| 5,172,314 | | 12/1992 | Poland et al. . | |
| 5,271,641 | | 12/1993 | Whited . | |
| 5,550,745 | | 8/1996 | Wurz . | |
| 5,619,416 | | 4/1997 | Kosarew . | |
| 5,658,631 | * | 8/1997 | Bernstein et al. | 428/42.1 |
| 5,662,976 | * | 9/1997 | Popat et al. | 428/41.9 X |
| 5,989,667 | * | 11/1999 | Tayebi | 428/42.1 X |

FOREIGN PATENT DOCUMENTS

| | | |
|---|---|---|
| 0689180 | 12/1995 | (EP) . |
| 0763471 | 3/1997 | (EP) . |

* cited by examiner

*Primary Examiner*—Daniel Zirker
(74) *Attorney, Agent, or Firm*—Francis L. Conte

(57) ABSTRACT

A label for an electronic price tag includes a panel having an opposite face and back, and a border surrounding a removable strip for overlaying a visual display of the tag. An adhesive is disposed on the label back for bonding the label to the tag. And, a barrier is disposed on the adhesive under the strip for desensitizing adhesion of the strip with the tag display. The strip is readily removable from the label and display since the barrier degrades adhesive effectiveness.

20 Claims, 5 Drawing Sheets

DESENSITIZED PRICE LABEL

BACKGROUND OF THE INVENTION

The present invention relates generally to electronic price tags, and, more specifically, to face labels therefor.

A merchandising store, such as a grocery supermarket, displays items for sale on shelves, with a price label being provided for identifying the product by description, measure, and price. In order to automate product pricing, electronic price labels have been developed and are in current use at various locations.

In one form, the electronic price label (EPL) comprises a thin rectangular tag having face and back sides, and suitable low-power electronics therein. The EPL tag has a visual electronic display, such as a conventional liquid crystal display (RED), which may operate continuously for an extended period of time on battery power. The display typically includes multiple digits for displaying the desired retail price and unit price for example.

Each tag is programmed during manufacture for providing a unique serial number, with each tag also including a back label for identifying the programmed serial number, typically in barcode form.

During use, each tag is associated with a given product and includes a face label identifying the corresponding product and pricing information. A typical face label is pre-printed to identify the product, the universal product code (UPC) or SKU barcode, and the name of the store.

A typical face label is a pressure sensitive label initially affixed to a release liner by an adhesive. The label is peeled from the liner and bonded atop the EPL tag using the same adhesive provided therewith.

As each label is applied to a respective tag, the corresponding tag serial number must be correlated with the product for allowing programming of the price thereof. U.S. Pat. No. 5,619,416 discloses a system and method for automatically labeling the EPL tags. In this patent, the face label includes a patch or strip which is initially bonded atop the tag display when the label is applied to the tag. The strip is printed during the application process with variable data such as a record number (RN) in barcode form corresponding with the specific product associated with the EPL tag.

Accordingly, as each tag is finally installed on a store shelf for a specific product, the strip is peeled away from the label and underlying tag display, with the RN barcode being read for correlating the installed tag with the corresponding product. The removed strip then exposes the tag display which is programmed for the retail and unit price of the corresponding product for being seen by store customers.

Although the label strip is eventually removed from the label after being attached to the EPL tag, it must be sufficiently secured to the label for undergoing the various steps during manufacture, printing, and application of the label without being prematurely liberated therefrom. Since the back side of the label and strip is covered by adhesive, premature liberation of a strip not only causes a defective label but may also inadvertently attach to processing equipment possibly causing jamming thereof.

Furthermore, removal of the strip from the tag display may cause tearing of the strip itself or leave behind portions thereof including adhesive which must be suitably removed in a subsequent operation increasing the time and expense of label application.

In some EPL tags, an integral push button is provided on the face of the tag near the visual display which may be used by a clerk or customer for accessing additional data from the tag for visual display when the button is pushed. The face label is adhesively bonded atop the push button in one configuration, and the adhesive atop the push button may cause interference with the operation of the push button over time.

Accordingly, it is desired to provide an improved face label for an EPL tag which overcomes one or more of these problems in the manufacture and application thereof.

BRIEF SUMMARY OF THE INVENTION

A label for an electronic price tag includes an opposite face and back, and a border surrounding a removable strip for overlaying a visual display of the tag. An adhesive is disposed on the label back for bonding the label to the tag. And, a barrier is disposed on the adhesive under the strip for desensitizing adhesion of the strip with the tag display. The strip is readily removable from the label and display since the barrier degrades adhesive effectiveness.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
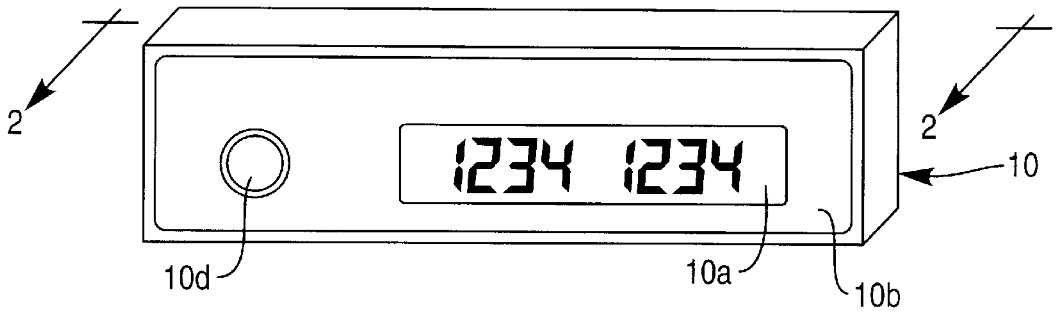
FIG. 1 is an isometric view of a face side of an exemplary EPL tag having a multidigit electronic visual display and push button.

Illustrated in FIG. 1 is an exemplary EPL tag 10 in rectangular form. The tag is conventional and includes a visual electronic display 10*a* in the exemplary form of a liquid crystal display (LCD) on a front face or side 10*b* thereof.

The inside of the tag includes suitable, programmable electronics which are battery powered to operate the display. The tag may be programmed to display numbers indicative of retail price and unit price for a specific product, for example.

The tag electronics include a suitable memory for storing desired information therein, and a radio receiver for remotely reprogramming the tag for changing pricing information, for example. The memory is programmed at manufacture to include a unique serial number for identifying the tag, and for correlating a specific product and price therefor associated with the specific tag and corresponding product.

Figure 2:
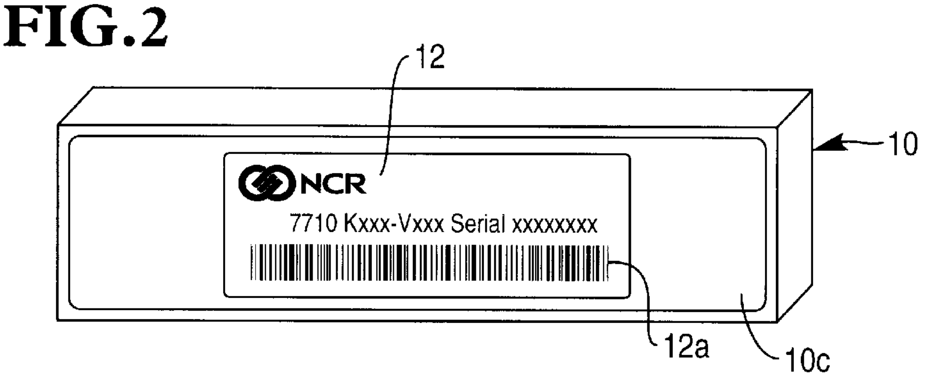
FIG. 2 is an isometric view of a back side of the EPL tag illustrated in FIG. 1 and taken along line 2—2, and illustrates a back label secured thereto.

When the tag is manufactured, a suitable identification label 12 as illustrated in FIG. 2 is secured to any suitable location thereon such as its back face or side 10*c*. The back label may include any desired information including identification of the tag manufacturer, and an identification barcode 12*a* identifying the tag and including at least in part the serial number programmed in the tag.

Figure 3:
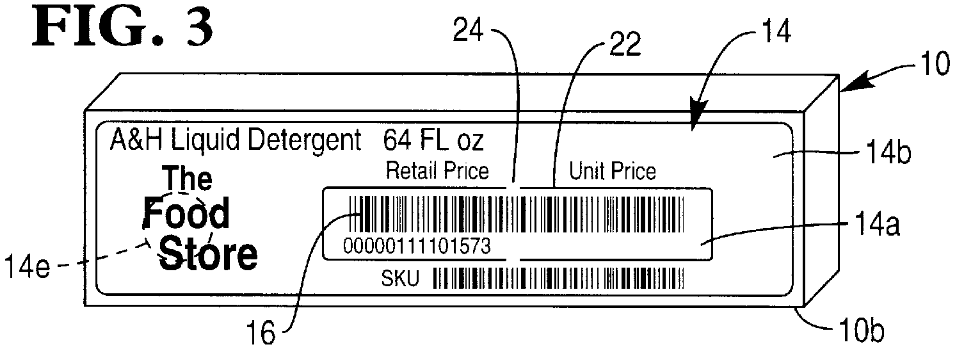
FIG. 3 is an isometric view of the front side of the tag illustrated in FIG. 1 having a face label secured thereto, with the face label including a removable strip covering the tag display.

A typical merchant will require hundreds or thousands of the tags for use in a given store, with each tag being specifically provided for a different product to be sold within the store. Accordingly, it is desired to affix to the front side of the tag as illustrated in FIG. 3, a suitable face label 14. This label may include, for example, a printed product description, a unit of measure, and size. The face label may also include additional information as desired such as the name of the specific store, trademark, and artistic display. The label may also include a conventional UPC or SKU number in barcode form.

Figure 4:
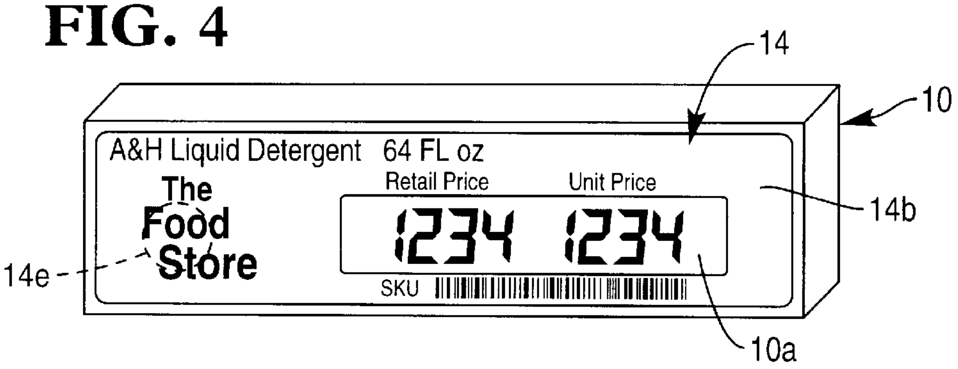
FIG. 4 is a isometric view of the EPL tag illustrated in FIG. 3 with the strip being removed for exposing the display.

Since each EPL tag is generic, its serial number must be correlated with the product description contained in the face label to allow corresponding programming of price therein, for example. As shown in FIG. 3, the face label includes a patch or strip 14*a* on which a unique record number 16 in barcode form, for example, may be printed. The strip 14*a* is preferably sized to match the perimeter of the visual display 10*a* illustrated in FIG. 1 so that it may be manually peeled or torn away from the tag to expose the visual display as illustrated in FIG. 4. The tag 10 illustrated in FIG. 4 is in final form with its attached face label 14 for identifying the product associated therewith in a merchandising store when attached to its specific shelf location.

U.S. Pat. No. 5,619,416 identified above discloses a system and method for automatically labeling a series of the EPL tags with corresponding face labels for correlating specific products with corresponding tags. The present invention is an improvement in the labeling system of that patent for solving problems associated with the adhesive found on the back of the face label 14 provided for bonding the label to the front of the tag.

Figure 5:
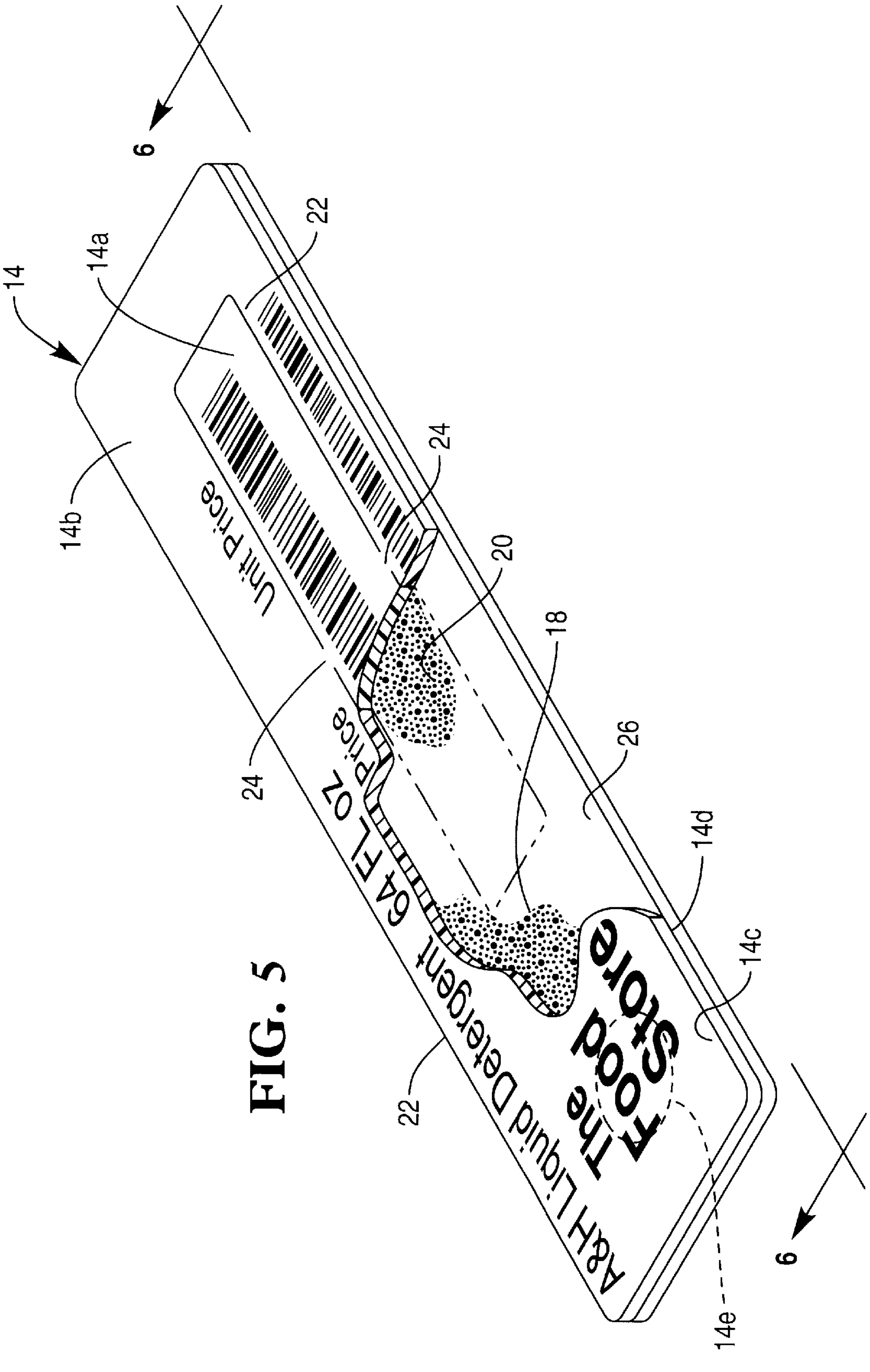
FIG. 5 is an isometric, partly sectional view of the face label illustrated in FIG. 3 attached to a liner prior to being applied to the tag.

FIG. 5 illustrates an exemplary face label 14 prior to application to the tag 10. The label includes the removable strip 14*a* surrounded by a border 14*b*. The strip has a rectangular configuration to match the corresponding rectangular configuration of the tag display 10*a* to initially overlay that tag display during the assembly process as illustrated in FIG. 3.

The face label 14 is in the form of a panel or sheet having any suitable material composition such as polyolefin for its resistance to tearing. The label has a face 14*c* and back 14*d* on opposite sides or surfaces thereof, and as additionally shown in FIG. 6.

The label is preferably in the form of a pressure sensitive label having a suitable adhesive 18 disposed or coated over the entire label back 14*d* which is subsequently used for bonding the label to the front of the tag 10.

Figure 6:
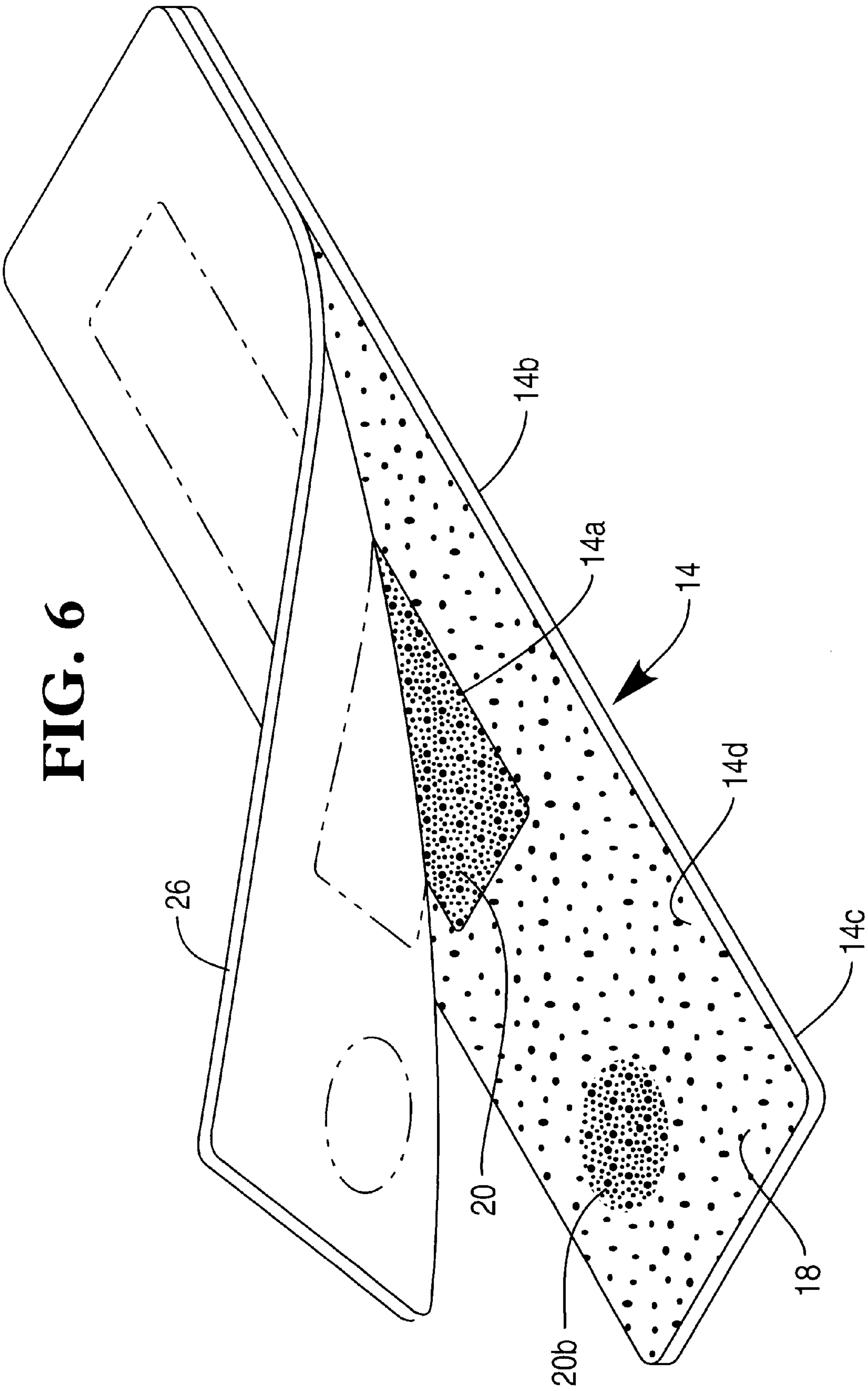
FIG. 6 is an isometric view of the underside of the label and liner illustrated in FIG. 5 and taken generally along line 6—6, with the liner being partially peeled away.

As best shown in FIG. 6, a first barrier 20 is disposed or coated on the adhesive 18 under the strip 14*a* for desensitizing or degrading adhesion of the strip 14*a* with the tag display 10*a* when initially bonded thereto as illustrated in FIG. 3. By degrading adhesion of the adhesive 18 underlying the strip 14*a*, the strip may be readily removed from the label border and tag for uncovering the tag display 10*a* illustrated in FIG. 4. The barrier 20 substantially reduces the likelihood of inadvertent tearing of the strip 14*a* as it is removed from the tag, and ensures that none of the adhesive 18 remains atop the tag display which would require subsequent cleaning thereof.

As shown in FIG. 5, a die-cut 22 severs the strip 14*a* from the border 14*b* and is formed in any conventional manner. In accordance with one feature of the present invention, the die-cut 22 preferably extends completely or continuously around the perimeter of the strip 14*a* except for a plurality of interruptions in the die-cut which define respective ties 24. The barrier 20 preferably fully covers the adhesive 18 within the perimeter of the strip 14*a* bounded by the die-cut 22. Since the barrier 20 degrades the adhesion of the adhesive 18 under the strip 14*a*, and since the die-cuts 22 sever the strip from the label border, the ties 24 are introduced for maintaining structural integrity of the label during the manufacturing and application process to prevent premature liberation of the strip prior to final removal of the strip itself.

As shown in FIGS. 5 and 6, the label 14 is initially formed in a laminate including a release liner 26 which is removably bonded to the label back 14*d* by the adhesive 18. The release liner 26 may have any conventional form, and is typically a silicone impregnated paper having limited adhesion to the adhesive 18. The label laminate is typically obtained from a manufacturer with face stock being adhesively bonded to the liner for use in subsequent manufacturing steps which size and cut individual labels to desired form, and print the labels with any suitable information. Pressure sensitive labels of this type are well known in the commercial field, with individual labels being readily removed from the liner by peeling therefrom and re-bonded to any desired object using the same adhesive already coating the back of the label.

By introducing the strip barrier 20 selectively between the adhesive 18 underlying the strip 14*a* and the liner 26 with which it is laminated, the adhesive's bond with the liner is substantially reduced or eliminated. And, adhesion of the barrier coated strip 14*a* is also degraded or eliminated when the label is removed from the liner and applied atop the tag illustrated in FIG. 3. This permits the strip 14*a* to be subsequently removed from the tag with substantially little or no resistance as compared to the construction without the barrier 18 as indicated above. The ties 24 interrupting the perimeter die-cut 22 offset the loss of adhesion to the liner introduced by the barrier 18.

As shown in FIG. 1, the tag 10 preferably also includes a push button 10*d* at any suitable location adjacent the display 10*a*. The push button may have any conventional form and is operatively joined to the electronics inside the tag for changing the information presented on the display 10*a*. For example, a store clerk may push the button 10*d* for temporarily displaying a regular price when the associated product is on sale at a reduced price.

In one embodiment, the push button 10d is hidden behind the label 14 as illustrated in FIG. 4, and may be activated by pushing a corresponding spot 14*e* of the label border 14*b* under which the button is hidden. However, in conventional practice, pushing the spot 14*e* repetitively over time can lead to malfunction of push button operation due to the adhesive commonly used in pressure sensitive labels.

Accordingly, another feature of the present invention is the use of a second barrier 20*b* disposed on the adhesive 18, as illustrated in FIG. 6, directly under the spot 14*e* of the border, as illustrated in FIG. 5. The spot barrier 20*b* is similarly used for desensitizing or degrading adhesion of the adhesive underlying the spot 14*e* with the push button 10*d* located therebelow. In this way, the spot barrier uncouples the spot 14*e* from the push button so that the adhesive under the spot does not bond the spot to the push button for permitting unobstructed use thereof. And, over repeated pushing of the spot 14*e*, operation of the push button is not compromised by the adhesive 18.

Figure 7:
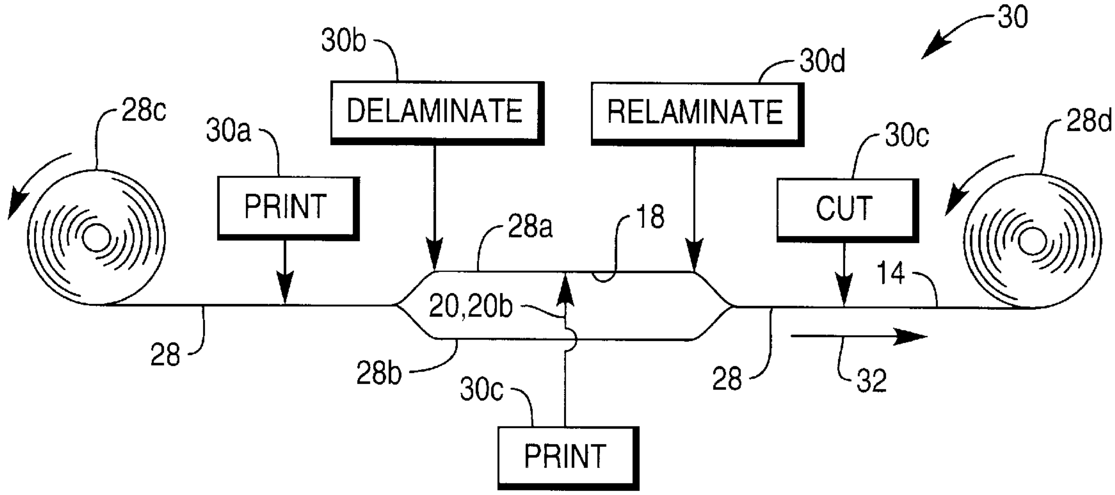
FIG. 7 is a schematic representation of a label press configured for forming a series of the labels illustrated in FIGS. 5 and 6.

FIG. 7 illustrates schematically an apparatus and method for making the labels 14 illustrated in FIGS. 5 and 6 in one embodiment. The method begins by providing a continuous web 28 of label face sheet or laminate 28a adhesively bonded to a release liner 28*b*. The web 28 is typically obtained from a commercial vendor in the form of an unprinted blank roll 28*c* in which the adhesive 18 is disposed between the laminate and liner in an integral construction.

The blank roll 28*c* is mounted in a conventional label press 30 which includes a first printer 30*a* which prints atop the laminate 28*a* any desired information, such the information printed on the label border 14*b* illustrated in FIG. 3.

The press further includes a delaminator 30*b* which is conventionally configured for delaminating the laminate 28*a*, with the adhesive 18 thereon, from the liner 28*b* in a continuous operation. A second printer 30*c* is then used for applying or printing the barrier 20,20*b* selectively on the adhesive 18 in a series of spaced apart barriers along the laminate which correspond with a series of labels thereon.

The barrier 20 is in the prefered form of a desensitizing ink having any conventional composition for being readily printed on the adhesive 18 underlying the laminate 28*a*. The second printer 30*c* is conventional and may be used to accurately print the desensitizing ink barrier in any desired configurafion below the laminate 28*a*. In this way, both the strip barrier 20 configured for underlying the entire rectangular extent of the label strip 14*a* and the spot barrier 20*b* configured for underlying the label spot 14*e* may be precisely positioned.

A relaminator 30*d* is then used for conventionally relaminating the laminate 28*a* and liner 28*b* using the same adhesive 18 bonded to the laminate to again form the integral web 28 having printing atop the laminate 28*a* and therebelow between the underlying adhesive 18 and the liner 28*b*.

In this way a series of the labels 14 illustrated in FIG. 5 may be produced along the running axis 32 of the web 28 in a continuous operation. A conventional die-cutter 30*e* is then used for die-cutting the laminate 28*a* to form a series of the labels 14 thereon each having a respective strip 14*a* as illustrated in FIG. 5 separated from the liner by respective ones of the strip barriers 20. And, each strip 14*a* is configured to overlay respective ones of the displays 10*a* of a number of tags 10.

Figure 8:
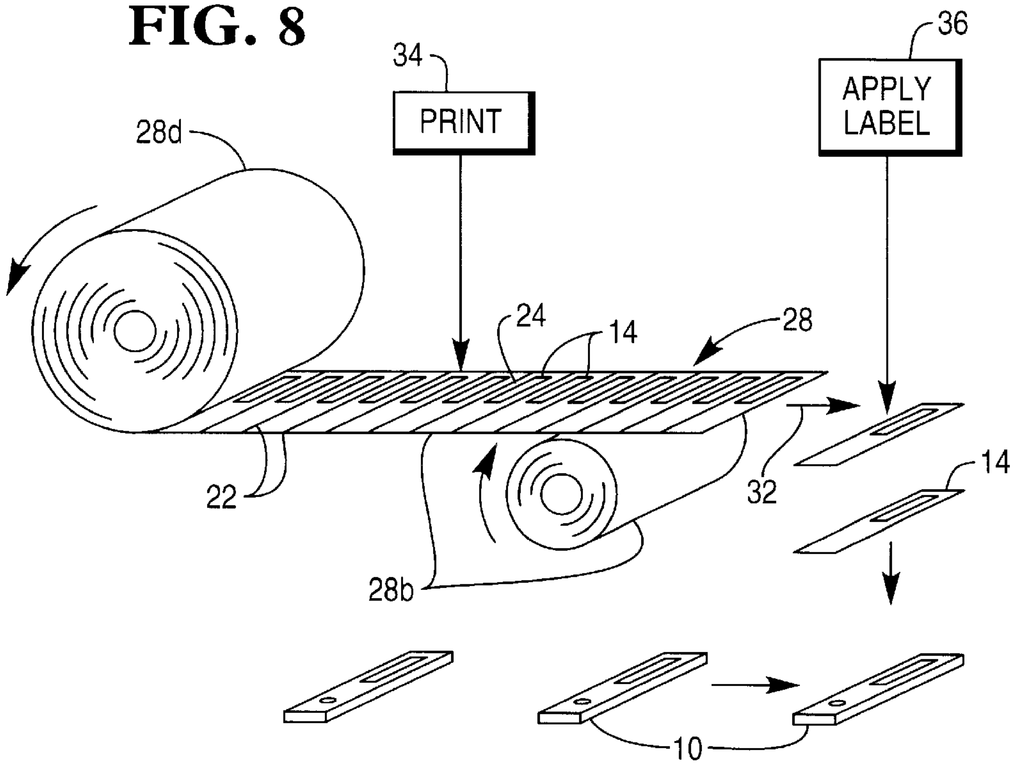
FIG. 8 is a schematic representation of an apparatus for applying the labels made in FIG. 7 to a series of EPL tags.

The die-cutter 30*e* illustrated in FIG. 7 die-cuts the leading and trailing edges of each label 14 along the running axis 32 as illustrated in FIG. 8 to sever adjacent ones of the labels 14 for permitting their subsequent removal from the underlying web liner 28.

As shown in FIG. 8, the labels 14 are interconnected by the web liner 28 in a series along the running axis 32. The processed label roll 28*d* illustrated in FIG. 7 is then installed in a third printer 34 for printing any variable data on the corresponding labels 14, such as the RN barcode 16 printed atop the label strips 14*a* as illustrated in FIG. 3. From the printer 34, the web 28 travels through a conventional label applicator 36 which removes the individual labels 14 from the web liner 28*b* and applies the labels 14 in turn atop corresponding ones of the EPL tags 10 suitably conveyed therebelow.

Accordingly, the web liner 28*b* is removed from the web laminate 28*a*, and the individual die-cut labels 14 are applied to respective ones of the tags 10 in the label applicator 36. The corresponding strips 14*a* then cover the respective tag displays 10*a* as shown for the exemplary tag illustrated in FIG. 3. The individual strips 14*a* may then be removed from the corresponding labels 14 atop the tags 10 as illustrated in FIG. 9 to expose to view the tag displays 10*a* therebelow.

Figure 9:
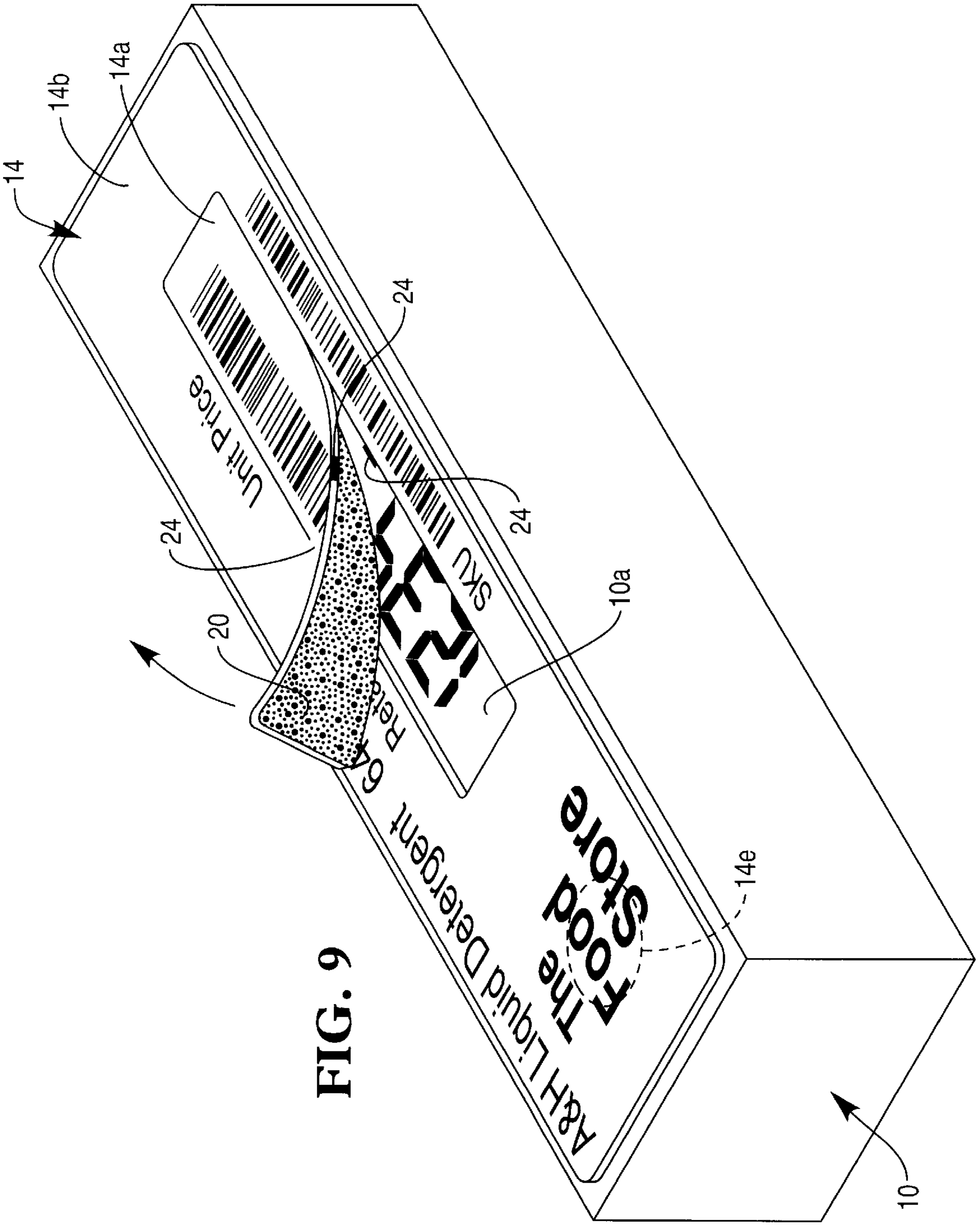
FIG. 9 is an isometric view of an exemplary EPL tag labeled in FIG. 8, and corresponding with FIG. 3, with the strip being peeled away to expose the underlying tag display.

An exemplary one of the tags 10 on which is applied a corresponding label 14 is illustrated in FIGS. 3 and 9. The ties 24 ensure that the respective strips 14*a* remain attached to the label borders 14*b* during the printing, cutting, and application operations without being prematurely liberated from the label. Since the labels are formed in a series along the running axis of the continuous web 28, the ties 24 illustrated in FIG. 3 are preferably disposed at the leading and trailing edges of each of the strips 14*a* which is relative to the running axis 32 illustrated in FIGS. 7 and 8 along which the individual labels are formed.

Testing has shown that each of the strips 14*a* should include only two of the ties 22 centered on the opposite leading and trailing edges thereof for best maintaining integrity of the strip 14*a* and surrounding border 14*b* during the processing thereof. The ties are readily broken as the individual strip 14*a* is peeled away from its border to expose the underlying tag display 10*a*, as illustrated in FIG. 9. In other embodiments, more or less ties may be used at different locations.

Accordingly, the EPL tag 10 illustrated in FIG. 3 in combination with its applied face label 14, including the strip 14*a* and border 14*b*, enjoys the additional benefit of the strip 14*a* being readily removable from atop the display 10*a* due to the strip barrier 20 therebetween. The label 14 is securely bonded to the tag except between the strip 14*a* and the display 10*a*, and except between the spot 14*e* and the underlying push button 10*d*.

The improved label described above has several advantages. The labels may be manufactured in a series on the roll webs 28 for increased speed. The integrated label strips 14*a* and the label borders 14*b* remain attached together by the ties 24 atop the underlying web liner 28 for permitting variable printing in the printer 34 and the individual application of the labels 14 to corresponding tags 10 as illustrated in FIG. 8. The individual label strips 14*a* may be dedicated for printing any desired variable data such as the RN barcode, with the strips remaining attached to the adjoining label borders even during the dispensing and application of the labels atop the tags 10.

The label strips 14*a* are readily removed from the individual tags 10 by peeling therefrom and severing of the ties 24. The strip barrier 20 ensures that no adhesive or portions of the strip 14*a* remain attached to the tag display 10*a*.

And, the spot barrier 20*b* maintains the functionality of the push button 10*d* notwithstanding the overlying label border and adhesive thereon. Pushing the label spot 14*e* in turn depresses the push button 10*d* without interference by the label adhesive, and the spot barrier 20*b* prevents interference of push button operation over an extended period.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

What is claimed is:

1. A label for an electronic price tag having a visual display, comprising:

a border surrounding a removable strip, with a label face and label back on opposite sides thereof, and with said strip being configured to overlay said tag display;

an adhesive adhered to said label back over both said border and strip for bonding said label to said tag; and a barrier disposed on said adhesive underlying said strip for desensitizing adhesion of said adhesive strip with said tag display.

2. A label according to claim 1 further comprising a die-cut severing said strip from said border.

3. A label according to claim 2 wherein:

said die-cut extends completely around a perimeter of said strip except for a plurality of interruptions defining respective ties; and said barrier covers said adhesive within said strip perimeter.

4. A label according to claim 3 wherein said tag includes a push button adjacent said display and said border includes a spot covered with said adhesive, and further comprising another barrier disposed on said adhesive underlying said spot for desensitizing adhesion of said adhesive spot with said push button.

5. A label according to claim 4 wherein said barriers comprise desensitizing ink.

6. A label according to claim 4 disposed in a series of labels interconnected along a running axis, and wherein said ties are disposed at leading and trailing edges of said strips.

7. A label according to claim 6 wherein said strip includes only two of said ties centered on said leading and trailing edges thereof.

8. A label according to claim 4 further comprising a liner removably bonded to said label back by said adhesive.

9. A label according to clam 4 in combination with said tag, with said label being bonded to said tag except between said strip and display, and except between said spot and push button.

10. A label according to claim 3 in combination with said tag, with said label being bonded to said tag except between said strip and display.

11. A method of making said label according to claim 1, comprising:

providing a web of label laminate having an adhesive bonded to a release liner;

delaminating said laminate, with said adhesive thereon, from said liner;

applying a barrier to said adhesive to form a series of barriers along said laminate;

relaminating said laminate and liner to again form said web; and cutting said laminate to form a series of said labels each of said labels having said strip surrounded by said border and separated from said liner by said barrier, and each strip being configured to overlay said tag display.

12. A method according to claim 11 wherein said barrier is applied to said adhesive by being printed thereon.

13. A method according to claim 12 wherein said barrier comprises a desensitizing ink printed on said adhesive.

14. A method according to claim 11 wherein said cutting severs adjacent ones of said labels, and severs said strips from said surrounding border in each of said labels.

15. A method according to claim 14 wherein:

each of said strips is die-cut completely around a perimeter thereof except for a plurality of interruptions defining respective ties; and said barrier covers said adhesive within each of said strip perimeters.

16. A method according to claim 15 wherein said tag includes a push button adjacent said display, and said method further comprises applying said barrier on said adhesive under a spot of said label border for desensitizing adhesion of said spot with said push button.

17. A method according to claim 15 wherein said labels are disposed on said web along a running axis, and said ties are disposed at leading and trailing edges of said strips.

18. A method according to claim 17 wherein each of said strips includes only two of said ties on opposite leading and trailing edges thereof.

19. A method of using said label according to claim 8 comprising:

removing said liner from said label; and applying said label to said tag, with said strip covering said display.

20. A method according to claim 19 further comprising removing said strip from said label atop said tag to expose said display therebelow.

* * * * *